(12) United States Patent
Andersson et al.

(10) Patent No.: US 11,331,727 B2
(45) Date of Patent: May 17, 2022

(54) METHOD OF ADDITIVELY MANUFACTURING A STRUCTURE ON A PRE-EXISTING COMPONENT OUT OF THE POWDER BED

(71) Applicant: Siemens Energy Global GmbH & Co. KG, Munich (DE)

(72) Inventors: Olov Andersson, Norrkoping (SE); Jonas Eriksson, Finspong (SE)

(73) Assignee: Siemens Energy Global GmbH & Co. KG, Munich (DE)

( * ) Notice: Subject to any disclaimer, the term of this patent is extended or adjusted under 35 U.S.C. 154(b) by 143 days.

(21) Appl. No.: 16/630,108

(22) PCT Filed: Jul. 19, 2018

(86) PCT No.: PCT/EP2018/069636
§ 371 (c)(1),
(2) Date: Jan. 10, 2020

(87) PCT Pub. No.: WO2019/029968
PCT Pub. Date: Feb. 14, 2019

(65) Prior Publication Data
US 2020/0164436 A1 May 28, 2020

(30) Foreign Application Priority Data
Aug. 11, 2017 (EP) .................... 17185920

(51) Int. Cl.
*B22F 10/20* (2021.01)
*B29C 64/357* (2017.01)
(Continued)

(52) U.S. Cl.
CPC ............ *B22F 10/20* (2021.01); *B29C 64/153* (2017.08); *B29C 64/245* (2017.08);
(Continued)

(58) Field of Classification Search
CPC .......... B22F 10/20; B22F 10/30; B22F 12/00; B22F 7/062; B22F 7/06; B22F 5/009;
(Continued)

(56) References Cited

U.S. PATENT DOCUMENTS

2003/0214571 A1 11/2003 Ishikawa et al.
2004/0112280 A1 6/2004 Beck et al.
(Continued)

FOREIGN PATENT DOCUMENTS

CN 1659479 A 8/2005
CN 104742376 A 7/2015
(Continued)

OTHER PUBLICATIONS

PCT International Search Report and Written Opinion of International Searching Authority dated Oct. 8, 2018 corresponding to PCT International Application No. PCT/EP2018/069636 filed Jul. 19, 2018.

(Continued)

*Primary Examiner* — Nahida Sultana

(57) ABSTRACT

A method of additive manufacturing a structure on a pre-existing includes disposing the pre-existing component in a bed of powdery base material and levelling the component, such that a manufacturing plane of the component can be recoated with the base material and alternatingly recoating and irradiating the manufacturing plane with an energy beam in order to additively build up the structure, wherein the irradiation is carried out in that the manufacturing plane is scanned by the beam in a non-continuous way, wherein, for the irradiation according to a second vector for the structure, the beam is either only guided parallel with respect to a previous first vector, or the irradiation process is paused after the irradiation of the first vector for a time span (Continued)

between 1/10 second to 2 seconds until the irradiation is continued with the second vector.

9 Claims, 2 Drawing Sheets

(51) Int. Cl.

| | | |
|---|---|---|
| *B29C 64/153* | (2017.01) | |
| *B29C 64/245* | (2017.01) | |
| *B29C 64/393* | (2017.01) | |
| *B29C 64/268* | (2017.01) | |
| *G06F 30/20* | (2020.01) | |
| *B33Y 10/00* | (2015.01) | |
| *B33Y 30/00* | (2015.01) | |
| *B33Y 50/02* | (2015.01) | |
| *B33Y 70/00* | (2020.01) | |
| *B33Y 40/20* | (2020.01) | |
| *G06F 113/10* | (2020.01) | |
| *B22F 10/30* | (2021.01) | |

(52) U.S. Cl.
CPC .......... *B29C 64/268* (2017.08); *B29C 64/357* (2017.08); *B29C 64/393* (2017.08); *G06F 30/20* (2020.01); *B22F 10/30* (2021.01); *B33Y 10/00* (2014.12); *B33Y 30/00* (2014.12); *B33Y 40/20* (2020.01); *B33Y 50/02* (2014.12); *B33Y 70/00* (2014.12); *G06F 2113/10* (2020.01)

(58) Field of Classification Search
CPC ....... B22F 5/04; B29C 64/357; B29C 64/153; B29C 64/245; B29C 64/393; B29C 64/268; G06F 30/20; G06F 2113/10; B33Y 10/00; B33Y 30/00; B33Y 50/02; B33Y 70/00; B33Y 40/20; Y02P 10/25; F05D 2230/31; C30B 13/06; C30B 13/24; C30B 13/32; C30B 29/52; F01D 5/005
See application file for complete search history.

(56) References Cited

U.S. PATENT DOCUMENTS

| | | | |
|---|---|---|---|
| 2015/0165545 A1 | 6/2015 | Goehler et al. | |
| 2016/0158889 A1 | 6/2016 | Carter et al. | |
| 2019/0263723 A1* | 8/2019 | Kasonde | B24D 18/0009 |
| 2019/0388968 A1* | 12/2019 | Narayanan | B23K 26/348 |
| 2021/0156312 A1* | 5/2021 | Donovan | B33Y 10/00 |

FOREIGN PATENT DOCUMENTS

| | | |
|---|---|---|
| CN | 105880593 A | 8/2016 |
| CN | 106735212 A | 5/2017 |
| EP | 2447045 A2 | 5/2012 |
| EP | 2601006 B1 | 6/2014 |
| EP | 2737965 A1 | 6/2014 |
| EP | 2886226 A2 | 6/2015 |

OTHER PUBLICATIONS

Zhai, Wei et al. "Effect of Scanning Routes on Forming Quality in Laser Rapid Forming"; Hot Working Technologiy; pp. 151-154, Year: Feb. 2017.

* cited by examiner

METHOD OF ADDITIVELY MANUFACTURING A STRUCTURE ON A PRE-EXISTING COMPONENT OUT OF THE POWDER BED

CROSS REFERENCE TO RELATED APPLICATIONS

This application is the US National Stage of International Application No. PCT/EP2018/069636 filed 19 Jul. 2018, and claims the benefit thereof. The International Application claims the benefit of European Application No. EP17185920 filed 11 Aug. 2017. All of the applications are incorporated by reference herein in their entirety.

FIELD OF INVENTION

The present invention relates to a method of additive manufacturing of the structure on a pre-existing, in particular single crystalline, component out of the powder bed. The method may relate to a repair or refurbishment method for gas turbine components, such as burners or blades. Further, an according apparatus comprising a radiation source, capable of generating a beam pattern, is presented.

Preferably, the component denotes a component applied in a turbo machine, e.g. in the flow path hardware of a gas turbine. The component is advantageously made of a superalloy and/or nickel-based alloy, particularly a precipitation, solution or age-hardened alloy.

BACKGROUND OF INVENTION

Additive manufacturing techniques comprise e.g. powder bed methods, such as selective laser melting (SLM) or selective laser sintering (SLS) or electron beam melting (EBM).

A method of selective laser melting is described in EP 2 601 006 B1, for example.

Additive manufacturing (AM) methods have proven to be useful and advantageous in the fabrication of prototypes or complex and filigree components, such as lightweight design or cooling components comprising mazelike internal structures. Further, additive manufacture stands out for its short chain of process steps, as a manufacturing step can be carried out directly based on corresponding CAD/CAM and/or construction data.

The term "additive" in the context of manufacturing shall particularly denote a layer-wise, generative and/or bottom-up manufacturing process. The additive manufacturing as described herein may be or relate to rapid prototyping.

Powder bed manufacturing methods such as selective laser melting or selective laser sintering are relatively well known methods for manufacturing parts or components from powder material, for instance. Conventional apparatuses or setups for such methods usually comprise a manufacturing or build platform on which the component is built layer-by-layer after the feeding of a layer of base material which may then be melted, e.g. by the energy of a laser beam and subsequently solidified. The layer thickness is e.g. determined by a wiper that moves, e.g. automatically, over the powder bed and removes excess material. Typical layer thicknesses amount to 20 µm or 40 µm. During the manufacture, said laser beam scans over the surface and melts the powder on selected areas which may be predetermined by a CAD-file according to the geometry of the component to be manufactured.

In gas turbine technology, particularly in the manufacture of components from the corresponding flow path hardware, there is the stringent demand to provide the components with excellent mechanical and thermal properties in order to enable the components to endure the harsh turbine environment. Particularly, the required creep and rupture resistivity of the components may almost only be complied with when awarding the components with a single crystalline structure. In case of turbine blades, which are conventionally refurbished by means of laser cladding or laser metal deposition, the refurbished structure has usually a poorer structural quality as compared to the cast root or base. Even though it may be possible, at least to a certain extent, to make the refurbished structure adopt crystallinity of the base in the LMD process, it is not yet achieved to provide for such a pseudomorphic or epitaxial "growth" of the refurbished structure in case of powder bed based process, such as SLM or EBM. Particularly, melt pool dynamics are important when it is intended to provide a refurbished structure with the same (single) crystalline properties as an underlying and pre-existing substrate structure.

SUMMARY OF INVENTION

It is, thus, an object of the present invention to provide means which allow an improvement of material phase and crystalline texture of a refurbished and/or manufactured structure on top of the pre-existing substrate in powder bed related additive processes.

The mentioned object is achieved by the subject-matters of the independent claims. Advantageous embodiments are subject-matter of the dependent claims.

An aspect of the present invention relates to a method of additive manufacturing of said structure on a pre-existing component. In case of a repair or hybrid-manufacturing method, the pre-existing component together with the coated or refurbished structure may then represent the refurbished part or article.

The method comprises disposing the pre-existing component in a bed of a powdery base material and levelling the component, such that a manufacturing plane of the component can be recoated with the base material. Therefore, a manufacturing plane is advantageously approached to the surface of the powder bed, or vice versa. This has expediently to be carried out in a very accurate manner, as recoated powder layer thicknesses amount to as little as 50 µm or less.

The method further comprises alternatingly recoating and irradiating the manufacturing plane with an energy beam in order to additively build up the structure, wherein the irradiation is carried out in that the (coated) manufacturing plane is scanned by the beam in a non-continuous way. In other words, the irradiation may be carried out in an interrupted way, i.e. interrupted by way of time and/or space.

The irradiation is further carried out in that—for the irradiation according to a second vector for the structure—the beam or beam spot on the powder bed is either only guided parallel with respect to a previous first vector or the irradiation process is paused after the irradiation of the first vector for a time span between e.g. 1/10 of a second to 2 seconds until the irradiation is continued with the second vector. The term "vector" as used herein shall describe a stripe or trajectory of the beam spot on the powder bed according to which base material is firstly melted and subsequently solidified. A vector may, thus, be a "stripe" or section according to which an area of the powder bed has to be exposed with the energy beam for solidification. It has to be noted that any area to be solidified has to be exposed with the energy beam according to specific vector pattern, as the desired area cannot be exposed as a whole.

By the given means, a favourable phase change from liquid to solid may be achieved which allows for a deposited structure to be textured according to the same crystallinity as the pre-existing component. In case of single crystalline, columnar crystalline or directionally solidified component, the structure may also be awarded with the same favourable crystalline mechanical properties as the component. This is achieved in that the scan vector or irradiation direction is advantageously chosen such that the melt pool always moves in "forward" direction and is not "turning back" into a previously heated area or zone affected by heat of the previous vector. Thus, the favourable crystalline texture of the structure is maintained or prevails and is not destroyed, as would be the case when the beam is "meandered back". The present invention addresses the need to increase process efficiency for industrialization of AM-manufacture. Particularly, the idea offers advantages for the manufacture of hybrid-parts.

In an embodiment—for the irradiation according to the second vector for the structure—the beam is not guided in a direction anti-parallel to the first vector, but only in a direction parallel to the first vector.

In an embodiment, the beam is scanned over the manufacturing plane in a lined or row-type, and advantageously not in a meander-like fashion. In other words, the vector geometry for the manufacturing process is chosen such that the irradiation is carried out according to the way of reading a book, i.e. linewise scanning, e.g. from the left to right, or vice versa.

In an embodiment the pre-existing component is a, in particular single, crystalline or directionally solidified structure.

In an embodiment, irradiation parameters are chosen such that the structure is established in a single crystalline texture as well.

In an embodiment, irradiation parameters are chosen such that the structure is established in a columnar crystalline texture.

In an embodiment, irradiation parameters are chosen such that the structure is established in a dendritic crystalline texture.

These embodiments, particularly the single crystalline embodiment of the pre-existing component as well as the structure, allow to award the structure and thus, the readily refurbished article with favourable material properties, e.g. properties which allow for highest (thermal) creep resistivity and rupture strength in an application of the article, e.g. the turbine blade during its intended operation.

Even when the structure is provided with a dendritic and/or somewhat polycrystalline texture on the single crystalline component, the inventive advantage can at least partly be exploited.

According to the presented method, the structure may be kinetically forced to "grow" or be established according to the same "crystallinity" as the component. This may be the case, as manufacturing parameters may be chosen such that a seeded, epitaxial, or pseudomorphic growth of the structure is facilitated.

The term "pseudomorphic" shall mean, that the structure adopts crystallinity of the underlying component at least up to a certain thickness.

In an embodiment, the method is a selective laser melting method.

In an embodiment, the method is a selective laser sintering method.

In an embodiment, the method is an electron beam melting method.

In an embodiment, the method is a repair process, wherein the structure is a refurbished or refurbishment structure.

A further aspect of the present invention relates to an apparatus for the additive manufacture of the structure from a powder bed comprising a substrate or support and a radiation source capable of generating a beam pattern (energy beam). The apparatus is further configured such that a manufacturing plane of the substrate can selectively be irradiated or exposed to with at least one energy beam in order to additively build up the structure on the substrate, wherein the substrate is displaceable, e.g. horizontally or laterally displaceable, with respect to the beam pattern only by mechanical means such as a gantry system. This advantageously allows for expensive optical scanners for the beam movement during the process to be dispensed with.

In an embodiment, the radiation source is configured to generate a row-type beam pattern of a plurality of energy beams.

In an embodiment, the apparatus is set up to displace the structure in a direction transverse to the row direction. According to this embodiment, the apparatus may be provided with a bar or brush of laser spots which can be mechanically replaced with respect to the support or the substrate by mechanical means. Thus, a cost-efficient "low-tech" approach may be provided for the apparatus, i.e. without the use of sophisticated optical measures, wherein at the same time the inventive advantages of the method may be realized.

Advantages relating to the described method and/or the described structure may as well pertain to the apparatus and vice versa.

BRIEF DESCRIPTION OF THE DRAWINGS

Further features, expediencies and advantageous refinements become apparent from the following description of the exemplary embodiment in connection with the Figures.

DETAILED DESCRIPTION OF INVENTION

Figure 1:
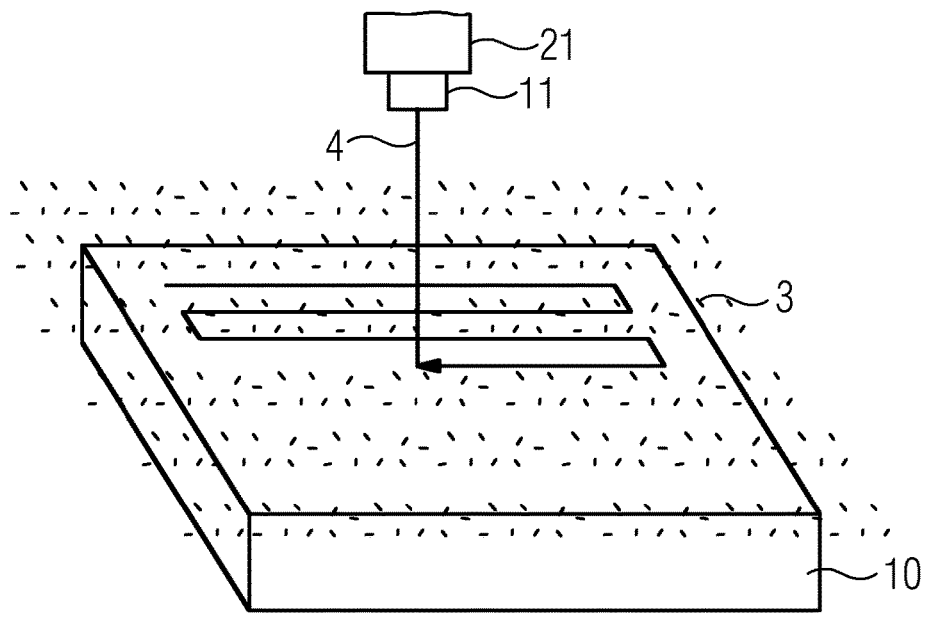
FIG. 1 shows a schematic perspective view of an additive manufacturing process of the prior art.

Like elements, elements of the same kind and identically acting elements may be provided with the same reference numerals in the Figures.

FIG. 1 shows an article or a part 10. The part 10 is actually being manufactured additively out of the powder bed 3 in that said powder is solidified by an energy beam 4. The energy beam 4 may be a laser beam. The energy beam 4 is advantageously generated by a radiation source 21. By means of the scanner 11 or according optics, the energy beam may, e.g. be moved over the powder bed 3 in a meander-like fashion, as shown and indicated by the arrow in FIG. 1.

The presented method as shown in FIG. 1 describes a conventional way of irradiating a powder bed. Each line, section or part of the trajectory of the beam 4 over the powder bed may be described by vectors which define or compose said meander. After a single layer of base material 3 has been solidified, a base or a support, carrying the part 10 is usually lowered by a distance corresponding to the layer thickness.

According to this conventional approach, e.g. after having guided the energy beam 4 in the first horizontal line, the energy beam is only marginally guided downwards, in order to "meander back" towards the beginning or in a direction anti-parallel to the first vector. Thereby, parts of the first irradiated lines, or vector(s) become again exposed to the heat of the energy beam 4, i.e. for a second time in a short time span. Thus, a melt pool (not explicitly indicated in FIG. 1; cf. numeral MP in FIG. 2) is moved again towards regions which have recently been melted. This provides adverse structural defects or poor crystallinity for the structure to be established, as the structure may be remelted (again) after it has once been solidified. This particularly prevents the structure from being established according to the same crystallinity as an underlying layer, for example.

Figure 2:
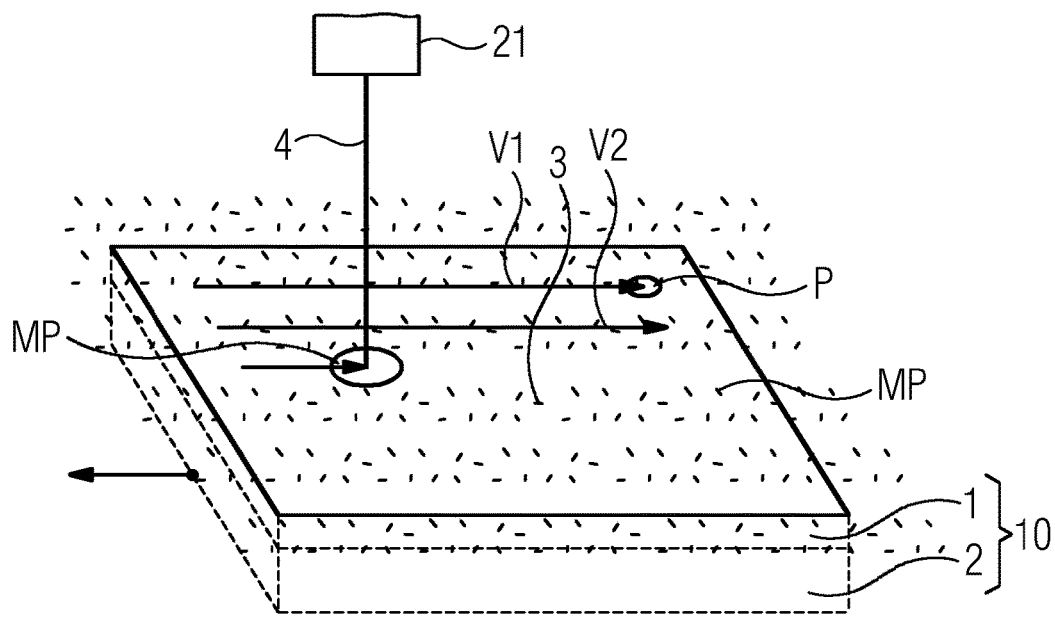
FIG. 2 shows a schematic perspective view of an additive manufacture of a structure on top of a pre-existing component out of the powder bed according to the present invention.

FIG. 2 illustrates the situation comparable to the one as shown in FIG. 1 wherein, however, a structure 1 which has newly to be manufactured, on top of the pre-existing component 2, is established out of the powder bed 3 according to the inventive method. The component 2 and the structure 1 may then, when completely be manufactured, represent a refurbished article 10.

Figure 4:
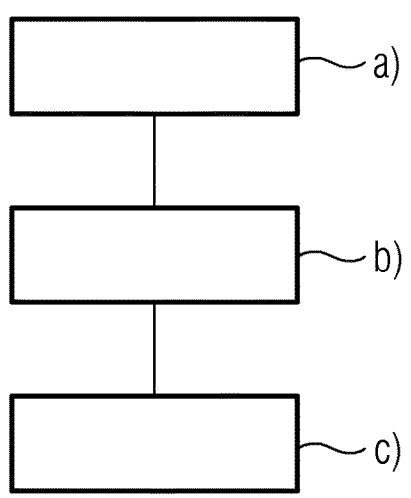
FIG. 4 shows a schematic flow chart of method steps of the present invention.

After the pre-existing component 2 having been disposed or arranged in the powder bed 3 (cf. step a) in FIG. 4), the component 2, or as the case may be a manufacturing plane MP thereof, has to be leveled (cf. step b) in FIG. 4) such that the manufacturing plane of the component can be recoated with the base material 3 and/or irradiated with the energy beam 4 (cf. step c) in FIG. 4).

According to the present invention, the irradiation is carried out in that the different vectors for the structure 1 are scanned by the laser beam 4 in a non-continuous and/or row-type fashion, e.g. according to the way of reading the lines of the book from left to right or vice versa.

In the present embodiment, the energy beam 4 is advantageously guided from left to right over the powder bed 3, as indicated by the arrows or vectors in FIG. 2. The top line, stripe or trajectory represents vector V1.

A subsequent vector according to which the base material 3 is to be irradiated or scanned afterwards is denoted with vector V2. In contrast to FIG. 1, after having scanned the first line or vector V1, irradiation is interrupted and the laser beam 4 is advantageously moved to the left side of the part in order to scan vector V2 in the same manner as vector V1. Therefore, the pre-existing component 2 or support carrying the same may be moved, e.g. to the left. Alternatively, an energy source 21 may be moved, e.g. to the right.

In an alternative embodiment, e.g. vector V2 may be scanned from right to left, i.e. anti-parallel with respect to vector V1. However, in this case, the irradiation has to be timely paused for a time span of e.g. a tenth of a second to 2 seconds, such that heat, provided from the energy beam to the powder bed may already have been dissipated until the energy beam 4 and therewith a melt pool MP, which may extend over various vectors, is moved again through already solidified regions.

Thus, the non-continuous, i.e. timely paused scan/irradiation direction of vectors provides as well for the inventive advantages, i.e. the establishment of the structure with a crystalline texture as the one of the pre-existing component.

Figure 3:
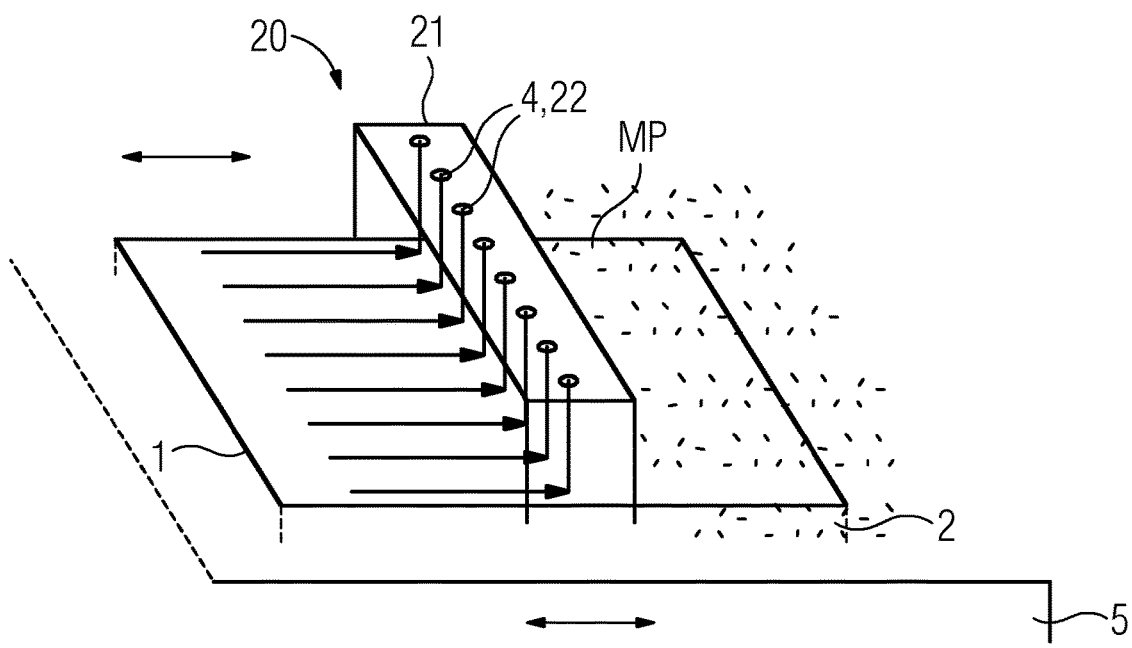
FIG. 3 shows a schematic perspective view of an apparatus according to the present invention.

FIG. 3 shows an apparatus 20 according to the present invention. The apparatus 20 comprises a gantry system or radiation source 21. The radiation source 21 comprises a plurality of laser emitters and/or laser beams 4. The radiation source 21 is capable of providing a row-type beam pattern 22. The radiation source 21 may be or comprise a laser bar. Reference numeral 21 may be a gantry.

The apparatus 20 further comprises a support or substrate 5. The substrate 5 is advantageously horizontally displaceable with respect to the beam pattern 22, viz. in a direction orthogonal to the row direction of the beam pattern 22. This is indicated by the arrow shown below in FIG. 3.

It is further indicated in FIG. 3 that—for the manufacturing of the structure 1 or for refurbishing of part 10 along with the inventive advantages, the whole row of energy beams may be moved simultaneously and relatively to the support (either by movement of the support relative to the radiation source 21 or vice versa).

Thereby, expensive optics or scanners for moving the energy beam, as is usual in SLM process, may be dispensed.

The scope of protection of the invention is not limited to the examples given hereinabove. The invention is embodied in each novel characteristic and each combination of characteristics, which particularly includes every combination of any features which are stated in the claims, even if this feature or this combination of features is not explicitly stated in the claims or in the examples.

The invention claimed is:

1. A method of additive manufacturing a structure on a pre-existing component, comprising:
    disposing the pre-existing component in a bed of powdery base material and levelling the component, such that a manufacturing plane of the component can be recoated with the base material,
    alternatingly recoating and irradiating the manufacturing plane with an energy beam in order to additively build up the structure,
    wherein the irradiation is carried out in that the manufacturing plane is scanned by the beam in a non-continuous way,
    wherein, for the irradiation according to a second vector for the structure, the beam is either only guided parallel with respect to a previous first vector, or the irradiation process is paused after the irradiation of the first vector for a time span between $\frac{1}{10}$ second to 2 seconds until the irradiation is continued with the second vector.

2. The method according to claim 1, wherein, for the irradiation according to the second vector for the structure, the beam is not guided in a direction anti-parallel to the first vector.

3. The method according to claim 1, wherein the beam is scanned over the manufacturing plane in a lined, non-meander-like fashion.

4. The method according to claim 1, wherein the pre-existing component comprises a crystalline structure, and wherein irradiation parameters are chosen such that the structure is established in a crystalline, columnar or dendritic crystalline texture, as well.

5. The method according to claim 1, wherein the additive manufacturing comprises a selective laser melting, selective laser sintering and/or electron beam melting method.

6. The method according to claim 1, wherein the additive manufacturing comprises a repair process, wherein the structure is a refurbishment structure.

7. An apparatus for the additive manufacture of a structure from a powder bed, comprising:
    a substrate and a radiation source capable of generating a beam pattern, the apparatus being configured such that a manufacturing plane on the substrate can selectively be irradiated with at least one energy beam in order to additively build up the structure on the substrate, wherein the substrate is displaceable with respect to the beam pattern only by mechanical means, or a gantry system, wherein the radiation source is configured to generate a row-type beam pattern of a plurality of energy beams such that the plurality of energy beams are parallel, and wherein the apparatus is set up to displace the substrate in a direction transverse to a row direction.

8. The method according to claim 4, wherein the pre-existing component comprises a single crystalline structure.

9. The method according to claim 4, wherein the irradiation parameters are chosen such that the structure is established in a single, crystalline, columnar or dendritic crystalline texture.

\* \* \* \* \*